United States Patent
Cen et al.

(10) Patent No.: US 12,360,650 B2
(45) Date of Patent: Jul. 15, 2025

(54) INTERACTION METHOD AND APPARATUS, ELECTRONIC DEVICE, STORAGE MEDIUM, AND COMPUTER PROGRAM PRODUCT

(71) Applicant: BEIJING YOUZHUJU NETWORK TECHNOLOGY CO., LTD., Beijing (CN)

(72) Inventors: Mingdi Cen, Beijing (CN); Xiaoran Zhu, Beijing (CN); Mengxue Sheng, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/759,237

(22) Filed: Jun. 28, 2024

(65) Prior Publication Data

US 2024/0353967 A1    Oct. 24, 2024

Related U.S. Application Data

(63) Continuation of application No. PCT/CN2022/139419, filed on Dec. 15, 2022.

(30) Foreign Application Priority Data

Jan. 5, 2022 (CN) .......................... 202210007525.2

(51) Int. Cl.
*G06F 3/0481* (2022.01)
*G06F 3/0346* (2013.01)
*G06F 3/0488* (2022.01)

(52) U.S. Cl.
CPC .......... *G06F 3/0481* (2013.01); *G06F 3/0346* (2013.01); *G06F 3/0488* (2013.01)

(58) Field of Classification Search
CPC ..... G06F 3/0346; G06F 3/0481; G06F 3/0488
See application file for complete search history.

(56) References Cited

U.S. PATENT DOCUMENTS

2015/0186944 A1    7/2015 Forsblom
2017/0199748 A1*   7/2017 Jerrard-Dunne .... G06F 3/04883
(Continued)

FOREIGN PATENT DOCUMENTS

CN    102118491 A    7/2011
CN    108769814 A    11/2018
(Continued)

OTHER PUBLICATIONS

International Search Report received for PCT Patent Application No. PCT/CN2022/139419, mailed on Mar. 8, 2023, 5 pages (2 pages of English Translation and 3 pages of Original Document).
(Continued)

*Primary Examiner* — Seth A Silverman

(57) ABSTRACT

The present invention provides an interaction method and apparatus, an electronic device, a storage medium, and a computer program product. The interaction method includes: playing an image of a background video on the display interface in response to a first control instruction; displaying an initial appearance of an interaction component in a first preset area of the image of the background video; controlling to change the initial appearance of the interaction component to a target appearance in response to a second control instruction triggered by a specified action of a user; and controlling the display interface to display a target image page in response to the interaction component presenting the target appearance.

13 Claims, 12 Drawing Sheets

System 100

(56) References Cited

U.S. PATENT DOCUMENTS

| | | | |
|---|---|---|---|
| 2018/0329622 A1* | 11/2018 | Missig | G06F 3/04886 |
| 2020/0336804 A1 | 10/2020 | Cui et al. | |
| 2020/0408521 A1* | 12/2020 | Lyons | G06F 3/04847 |
| 2021/0389961 A1 | 12/2021 | Xi | |
| 2022/0107724 A1* | 4/2022 | Lee | G06F 16/743 |
| 2022/0132225 A1* | 4/2022 | Lee | H04N 21/8541 |
| 2022/0247919 A1* | 8/2022 | O'Leary | H04N 5/2628 |
| 2022/0398786 A1 | 12/2022 | Qi et al. | |
| 2023/0124461 A1 | 4/2023 | Lin et al. | |
| 2023/0144110 A1 | 5/2023 | Sun et al. | |
| 2024/0040199 A1 | 2/2024 | Shi et al. | |
| 2024/0094875 A1 | 3/2024 | Jian et al. | |
| 2024/0126402 A1 | 4/2024 | Yao et al. | |
| 2024/0171821 A1 | 5/2024 | Yang et al. | |

FOREIGN PATENT DOCUMENTS

| | | |
|---|---|---|
| CN | 111669639 A | 9/2020 |
| CN | 111694631 A | 9/2020 |
| CN | 111899192 A | 11/2020 |
| CN | 112099713 A | 12/2020 |
| CN | 112817781 A | 5/2021 |
| CN | 112887777 A | 6/2021 |
| CN | 113031842 A | 6/2021 |
| CN | 113068053 A | 7/2021 |
| CN | 113179446 A | 7/2021 |
| CN | 113535033 A | 10/2021 |
| CN | 113542853 A | 10/2021 |
| CN | 114327214 A | 4/2022 |

OTHER PUBLICATIONS

Office action received from Chinese patent application No. 202210007525 mailed on Jul. 2, 2023, 18 pages (8 pages English Translation and 10 pages Original Copy).

Review Decision Letter for Chinese Application No. 202210007525.2, mailed on Dec. 4, 2024, 32 pages.

European Search Report for EP Patent Application No. 22918382.7, Issued on Jan. 30, 2025, 8 pages.

* cited by examiner

INTERACTION METHOD AND APPARATUS, ELECTRONIC DEVICE, STORAGE MEDIUM, AND COMPUTER PROGRAM PRODUCT

CROSS-REFERENCE TO RELATED APPLICATIONS

The present disclosure is based on and claims the benefit of Chinese Patent Application for invention No. 202210007525.2, filed on Jan. 5, 2022, the disclosure of which is hereby incorporated into this disclosure by reference in its entirety.

TECHNICAL FIELD

This disclosure relates to the technical field of image processing, in particular to an n interaction method and an apparatus, an electronic device, a storage medium, and a computer program product.

BACKGROUND

Advertising is a promotional tool that publicly and widely communicates information to the public by means of specific media for specific needs. Currently, most mainstream advertisements are presented in the form of cards, pages, or videos, and users can only passively accept the advertising content as viewers. The current interactive advertising provides some simple interactive functions.

SUMMARY

This disclosure provides an interaction method applied to a terminal device with a display interface, comprising:
  playing an image of a background video on the display interface in response to a first control instruction;
  displaying an initial appearance of an interaction component in a first preset area of the image of the background video;
  controlling to change the initial appearance of the interaction component to a target appearance in response to a second control instruction triggered by a specified action of a user; and
  controlling the display interface to display a target image page in response to the interaction component presenting the target appearance.

In some embodiments, the interaction method further comprises:
  displaying a first video accessory in a second preset area of the image of the background video before displaying the initial appearance of the interaction component in the first preset area of the image of the background video; and
  displaying the interaction component in the first preset area in response to the first video accessory meeting a preset condition.

In some embodiments, the first video accessory meeting the preset condition comprises:
  the first video accessory changing from a first display state to a second display state.

In some embodiments, the interaction method further comprises:
  controlling the display interface to display the target image page in response to a first touch instruction triggered by a click operation of the user on the first video accessory, wherein the first video accessory is in the first display state or the second display state.

In some embodiments, the controlling the display interface to display the target image page in response to the first touch instruction triggered by the click operation of the user on the first video accessory comprises:
  in response to the first touch instruction triggered by the click operation of the user on the first video accessory, controlling the display interface to display the target image page which has not been displayed previously.

In some embodiments, the second control instruction is triggered based on a movement of the terminal device, the movement of the terminal device being controlled based on a specified action of the user.

In some embodiments, triggering the second control instruction based on the movement of the terminal device comprises:
  triggering the second control instruction by the movement of the terminal device based on at least one of a preset rotation angle, a preset rotation direction, a preset number of rotations, or a preset rotation speed.

In some embodiments, the interaction component comprises a compass.

In some embodiments, the displaying the initial appearance of the interaction component comprises:
  displaying an initial orientation and a target orientation of a needle of the compass, and prompt information for indicating the user to perform the specified action, wherein the initial orientation and the target orientation are not coincident.

In some embodiments, the controlling to change the initial appearance of the interaction component to a target appearance comprises:
  controlling the needle to rotate based on the second control instruction to point the needle to the target orientation.

In some embodiments, the target orientation is determined based on collected device orientation information of the terminal device; or the target orientation is randomly obtained orientation information.

In some embodiments, the controlling the display interface to display the target image page in response to the interaction component presenting the target appearance comprises:
  hiding the compass in response to the needle pointing to the target orientation;
  displaying a preset animation in a third preset area of the image of the background video; and
  controlling the display interface to display the target image page in response to an ending of the preset animation.

In some embodiments, a second video accessory is displayed in the third preset area of the target image page, and the interaction method further comprises:
  after controlling the display interface to display the target image page, displaying an activity option icon in a fourth preset area of the target image page in response to a second touch instruction triggered by a click operation of the user on the second video accessory; and
  controlling the display interface to display a Join Activity page in response to a third touch instruction triggered by a click operation of the user on the activity option icon.

The present disclosure further provides an interaction apparatus, comprising:

a play module for playing an image of a background video on the display interface in response to a first control instruction;

a display module for displaying an initial appearance of an interaction component in a first preset area of the image of the background video;

a first control module for controlling to change the initial appearance of the interaction component to a target appearance in response to a second control instruction triggered by a specified action of a user; and a second control module for controlling the display interface to display a target image page in response to the interaction component presenting the target appearance.

The present disclosure further provides a terminal device, comprising a memory; and a processor coupled to the memory, the processor configured to, based on instructions stored in the memory, carry out the interaction method described in any of the above aspects.

The present disclosure further provides a non-transitory computer readable storage medium stored thereon a computer program that, when executed by a processor, performs the interaction method described in any of the above aspects.

The present disclosure further provides a computer program product including instructions that, when executed by a processor, cause the processor to perform the interaction method described in any of the above aspects.

The present disclosure further provides a computer program, comprising: instructions that, when executed by a processor, cause the processor to perform the interaction method described in any of the above aspects.

BRIEF DESCRIPTION OF THE DRAWINGS

In order to more clearly explain the embodiments of the present disclosure or the technical solutions in the prior art, a brief introduction will be given below for the drawings required to be used in the description of the embodiments or the prior art. It is obvious that, the drawings illustrated as follows are merely some embodiments of the present disclosure. For a person skilled in the art, he or she may also acquire other drawings according to such drawings on the premise that no inventive effort is involved.

DETAILED DESCRIPTION

For a clear understanding of the object of the present disclosure, its technical solution and advantages, the present disclosure will be further described in detail below in conjunction with the accompanying drawings and embodiments.

Note that unless defined otherwise, all technical and scientific terms used in the present disclosure have the same meaning as commonly understood by one of ordinary skill in the art to which the embodiments of the present disclosure belong. The use of the terms "first", "second" or the like in the present disclosure does not denote any order, quantity or importance, but are merely used to distinguish between different components. The terms "comprise", "include" and the like mean that the elements or objects preceding the term cover the elements or objects listed after the term and their equivalents, without excluding other elements or objects. The terms "connect", "connecting" and the like are not limited to physical or mechanical connections, but may include electrical connections, regardless of whether the connections are direct or indirect connections. The terms "up", "down", "left", "right" or the like are used only to represent a relative positional relationship, and the relative positional relationship may be changed if the absolute position of the described object changes.

Figure 1:
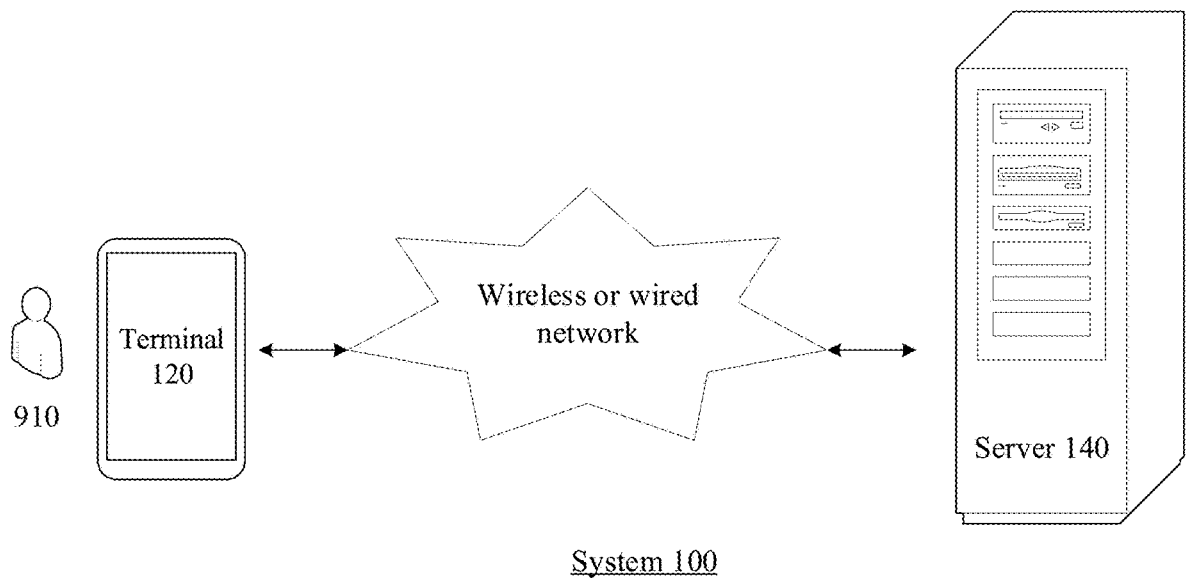
FIG. 1 is a schematic diagram of an exemplary system provided in an embodiment of the present disclosure.

FIG. 1 illustrates a schematic diagram of an exemplary system 100 including an apparatus in which the interaction method provided in an embodiment of the present disclosure may be applied.

As shown in FIG. 1, the system 100 includes a server 140 and at least one terminal device 120 connected over a wireless or wired network.

The server 140 includes at least one of a server, a plurality of servers, a cloud computing platform, or a virtualization center. The server 140 is used to provide backend services for various applications that support video image presentation. Optionally, the server 140 handles primary computing tasks and the terminal device handles secondary computing tasks; or the server 140 handles secondary computing tasks, while the terminal device handles primary computing tasks; or a distributed computing architecture may be used for collaborative computing between the server 140 and the terminal device.

The terminal device 120 can interact with the server 140 over a wireless or wired network to receive messages sent from the server 140 or send messages to the server 140. Apps that support video image presentation can be installed on the terminal device, such as video playback Apps, short video Apps, live streaming Apps, social platform Apps, etc. The apps can also be various Apps that support startup (launch) animation. The terminal device 120 includes but is not limited to a smart phone, a tablet, etc.

In some embodiments, the system 100 may achieve the distribution and playback of interactive advertisements. Data files of interactive advertisements stored on the server 140 are distributed to the terminal device 120 over a wireless or wired network. The terminal device 120 can play interactive advertisements corresponding to the data files based on the data files to transmit information to a user 910 holding the terminal device 120.

In some embodiments, the system 100 may also include a control device, which may be a device corresponding to a developer or a maintainer of the interactive advertisements. The developer or maintainer can use this control device to edit data of the interactive advertisements, generate interactive advertisement data files corresponding to the interactive advertisements, and store them in the server 140.

The current mainstream method of playing interactive advertisements on the terminal device 120 is to add a Shake gameplay when an application's start screen is displayed. In response to an application's start screen being displayed, a text message may be displayed prompting the user to shake his or her phone to access an ad landing page. A gyroscope detects the amplitude of the user's shake to determine whether to access the ad landing page.

However, these interactive ads can only support simple interactions, not easy to capture user interest; moreover, it is difficult for a terminal device such as a mobile phone to determine the boundary between "a normal shake when holding the phone" and "a shake that triggers an advertisement". Even if users do not want to access the ad landing page to view an advertisement, normal shaking of the mobile phone (such as shaking while walking or sitting in a car) may cause the advertisement to be mistakenly triggered to access the ad landing page, which may actually interfere with the user's experience.

In view of this, an embodiment of the present disclosure provides an interaction method for solving the above problem.

Figure 2:
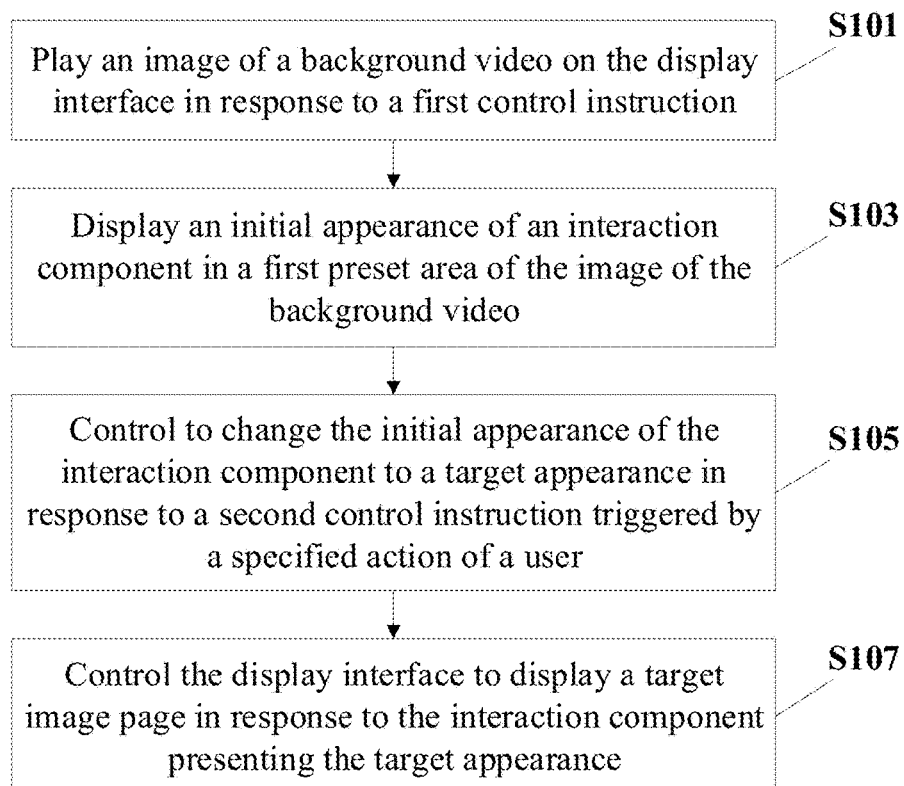
FIG. 2 is a flowchart of the interaction method provided in an embodiment of the present disclosure.

FIG. 2 is a flowchart of the interaction method provided in an embodiment of the present disclosure. This interaction method is applied to a terminal device with a display interface. The method includes the following steps.

In step S101, an image of a background video is played on the display interface in response to a first control instruction.

In step S103, an initial appearance of an interaction component is displayed in a first preset area of the image of the background video.

In step S105, the initial appearance of the interaction component is controlled to change to a target appearance in response to a second control instruction triggered by a specified action of a user.

In step S107, the display interface is controlled to display a target image page in response to the interaction component presenting the target appearance.

The interaction method described in this embodiment includes displaying an interaction component in a first preset area while an image of a background video is played on the display interface, and controlling the interaction component to change from an initial appearance to a target appearance based on a second control instruction triggered by the user's specified action; when the target appearance is presented for the interaction component, controlling the display interface to display a target image page, i.e., an ad landing page, thereby achieving playback of an interactive advertisement. In this embodiment, the display of the interaction component is controlled by the user's specified action. The target image page can be displayed only when the interaction component is presenting the target appearance, thereby preventing it from being accidentally triggered by the user and providing a better user experience.

The system 100 provided in an embodiment of the present disclosure will be further explained in conjunction with system 100 shown in FIG. 1.

Figure 3:
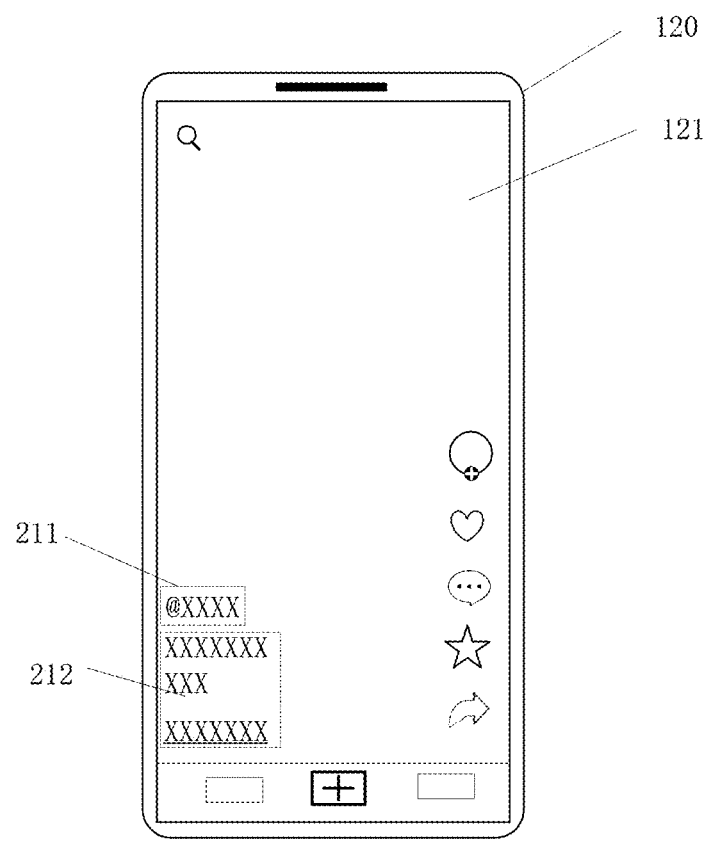
FIG. 3 is a schematic diagram of a display interface provided in an embodiment of the present disclosure.

As shown in FIG. 3, the terminal device 120 is equipped with a display screen, which is used to present a display interface 121 of an application that supports video image presentation. A user 910 controls the terminal device 120 through operation to cause the terminal device 120 to generate a first control instruction based on the user 910's operation control; the terminal device 120 plays an image of a background video on the display interface 121 under the control of the first control instruction.

In this embodiment, the image of the background video may include a video image played by a video playback application, a short video image played by a short video application, a live video image played by a live streaming application, or a start screen animation image of an application. Accordingly, the first control instruction can be a click-to-play instruction, an application launch instruction, etc. The image of the background video may be a dynamic image or a static image, which is not specifically limited herein.

In a specific embodiment, the image of the background video is an image of a short video, and the user 910 performs a slide operation on the display screen of the terminal device 120 to generate a first control instruction that is used to control the switching images of short videos. Under the control of the first control instruction, the display interface 121 of the terminal device 120 gradually changes the display from a previous video image to a current image of the background video.

In some embodiments, as shown in FIG. 3, first preset information 211 and second preset information 212 of the image of the background video are displayed on the image of the background video. The first preset information 211 and the second preset information 212 are displayed in the lower left corner of the image of the background video. In a specific embodiment, the first preset information 211 may be a name of the image of the background video, and the second preset information 212 may include introduction information about the image of the background video.

In some embodiments, the interaction method further comprises the following steps.

In step 201, a first video accessory is displayed in a second preset area of the image of the background video.

Figure 4:
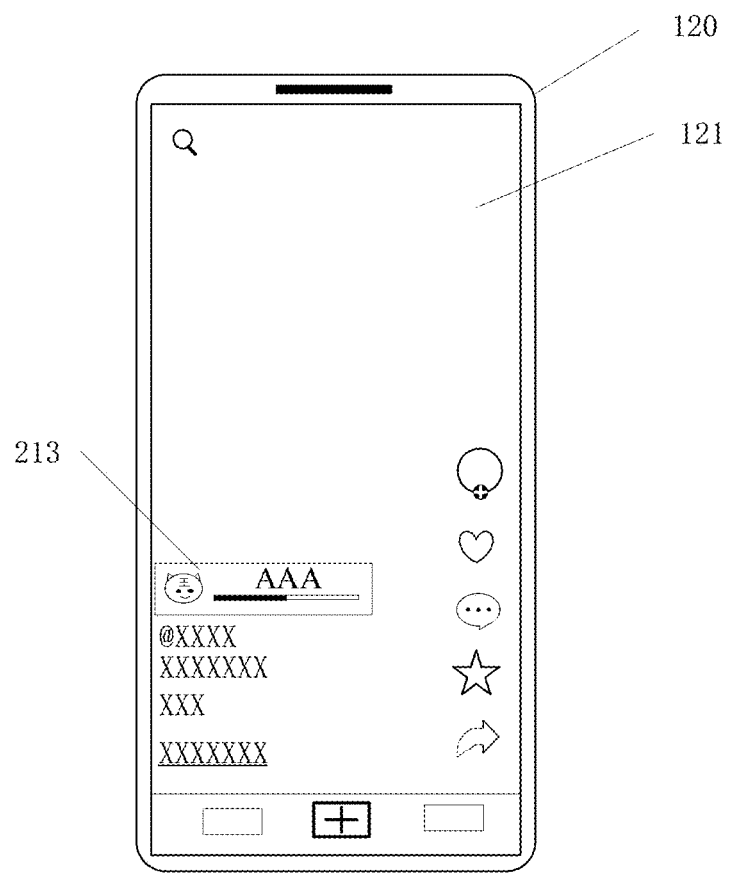
FIG. 4 is a schematic diagram showing a first display state of a first video accessory provided in an embodiment of the present disclosure.

As shown in FIG. 4, in this embodiment, when the display interface 121 begins to play the image of the background video, a first video accessory 213 is displayed in a second preset area of the image of the background video. In some specific embodiments, the second preset area may be located above the first preset information 211, that is, the first video accessory 213 is disposed above the first preset information 211.

In this embodiment, before displaying the image of the background video, the terminal device 120 can obtain a data file of the first video accessory 213 to render and load the first video accessory 213 in advance, thereby reducing the data processing load during loading of the image of the background video, ensuring the display effect of the first video accessory 213, and reducing the computational load of the terminal device 120. For example, in response to the display interface 121 of the terminal device 120 displaying an image of a previous video, a data file of the first video accessory 213 that matches the image of the background video to be played can be obtained to render and load the first video accessory 213; in response to the display interface 121 of the terminal device 120 displaying the image of the background video, the first video accessory 213 can be displayed in the second preset area.

In some embodiments, in response to the terminal device 120 fails to load or render the data file of the first video accessory 213, only the image of the background video is played without displaying the first video accessory 213.

In step S202, the interaction component is displayed in the first preset area in response to the first video accessory meeting a preset condition.

In some embodiments, the first video accessory meeting the preset condition comprises: the first video accessory changing from a first display state to a second display state.

Figure 5:
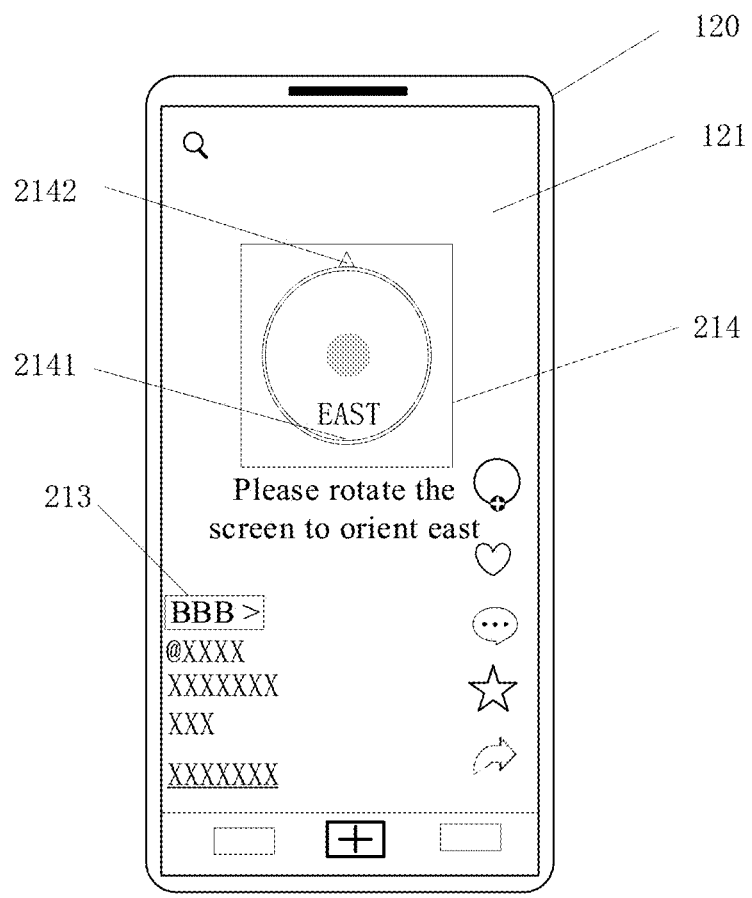
FIG. 5 is a schematic diagram showing an initial appearance of an interaction component provided in an embodiment of the present disclosure.

As shown in FIG. 4, when the first video accessory 213 is in the first display state, the first video accessory 213 includes a progress bar, text information, and image information. The text information can include prompt information such as "AAA", and image information can be a dynamic or static cartoon image. That is, when the playing of the image of the background video begins on the display interface 121, the first video accessory 213 comprising a progress bar is displayed above the first preset information 211 such as the name of the image of the background video, and a progress of the progress bar begins to move; when a progress of the progress bar reaches the end, the first video accessory 213 changes from the current first display state to a second display state, as shown in FIG. 5. In response to the first video accessory 213 being in the second display state, the first video accessory 213 includes text information such as "BBB".

In response to the first video accessory 213 being in the second display state, an interaction component is displayed in a first preset area of the image of the background video. In some embodiments, the first preset area may be a center area of the image of the background video.

In other embodiments, the first video accessory 213 meeting a preset condition comprises: a displaying duration of the first video accessory 213 is greater than a preset duration. In this embodiment, upon the first video accessory 213 displays for a preset duration, the interaction component is displayed in the first preset area of the image of the background video.

In this embodiment, before displaying the image of the background video, the terminal device 120 can obtain a data file of the interaction component to render and load the interaction component in advance, thereby reducing the data processing load during loading of the image of the background video, ensuring the display effect of the interaction component, and reducing the computational load of the terminal device 120. For example, in response to the display interface 121 of the terminal device 120 displaying an image of a previous video, a data file of an interaction component that matches the image of the background video to be played can be obtained to render and load the interaction component; in response to the display interface 121 of the terminal device 120 displaying the image of the background video, the interaction component can be displayed in the first preset area.

In some embodiments, it is determined that whether the data file of the interaction component is successfully loaded and rendered; in response to the terminal device 120 failing to load or render the data file of the interaction component, only the image of the background video is played without displaying the interaction component; in response to the data file of the interaction component being successfully loaded and rendered on the terminal device 120, the interaction component will be displayed in the first preset area.

When the interaction component is displayed in the first preset area of the image of the background video, an initial appearance of the interaction component is displayed first. Then, the interaction component is controlled to change its initial appearance to a target appearance based on a second control instruction triggered by a specified action of the user.

In some embodiments, triggering a second control instruction in response to a specified action of the user in step S105 includes: controlling the terminal device to move based on the specified action of the user, and triggering the second control instruction based on the movement of the terminal device. Triggering the second control instruction based on the movement of the terminal device comprises: triggering the second control instruction by the movement of the terminal device based on at least one of a preset rotation angle, a preset rotation direction, a preset number of rotations, or a preset rotation speed.

In some embodiments, the user is instructed to control to change the initial appearance of the interaction component to the target appearance within a preset time, such as 3 seconds; in response to the interaction component is not changed from the initial appearance to the target appearance within the preset duration, the terminal device 120 determines that the user does not wish to access the target image page and then controls to hide the interaction component.

In this embodiment, when the initial appearance of the interaction component is displayed, instruction information is also displayed to instruct the user to control the terminal device 120 to move by a specified action to trigger the second control instruction. The specified action of the user comprises controlling at least a portion of the terminal device 120 to move based on at least one of a preset rotation angle, a preset rotation direction, a preset number of rotations, or a preset rotation speed, for example, controlling the terminal device 120 to rotate horizontally, controlling the terminal device 120 to tilt left, controlling the terminal device 120 to shake left and right three times, etc., which is not specifically limited in this embodiment.

When the user 910 controls the terminal device 120 to move with the specified action described above, a second control instruction of the terminal device 120 can be triggered, so that terminal device 120 can control the interaction component to change the initial appearance to the target appearance based on the second control instruction.

In a specific embodiment, as shown in FIG. 5, the interaction component 214 includes a compass. The initial appearance of the interaction component 214 includes an initial orientation and a target orientation 2141 of a compass needle 2142, as well as prompt information instructing the user 910 to perform a specified action. Therefore, the initial orientation and target orientation 2141 of the compass needle 2142, as well as the prompt information instructing the user 910 to perform a specified action are displayed in the initial appearance of the compass.

The initial orientation of the needle 2142 does not coincide with the target orientation 2141. In some embodiments, the bearing between the initial orientation of the needle 2142 and the target orientation 2141 is greater than a preset threshold, thereby avoiding false triggering caused by normal shaking of the terminal device 120 due to a too small bearing between the initial orientation of the needle 2142 and the target orientation 2141. The terminal device 120 can access a jsb file to obtain bearing information between the initial orientation of the needle 2142 and the target orientation 2141 for a later use.

As shown in FIG. 5, in a specific embodiment, the target orientation 2141 of the compass needle 2142 is "East", or may be any of other orientations such as "West", "South", "North", etc., which is not specifically limited in this embodiment.

For the target orientation 2141 of the compass needle 2142, device orientation information of the terminal device 120, such as gyroscope parameters, can be collected with user authorization, and the target orientation 2141 is determined based on this device orientation information.

Alternatively, in a case where user authorization is not available or device orientation information cannot be collected, a random orientation can be obtained as the target orientation.

FIG. 5 shows an example where the target orientation 2141 of the compass needle 2142 is "East", the prompt information used to instruct the user 910 to perform a specified action can be a text prompt message "Please rotate the screen to orient east", or prompt information in other forms, such as an image, which is not specifically limited in this embodiment.

Figure 6:
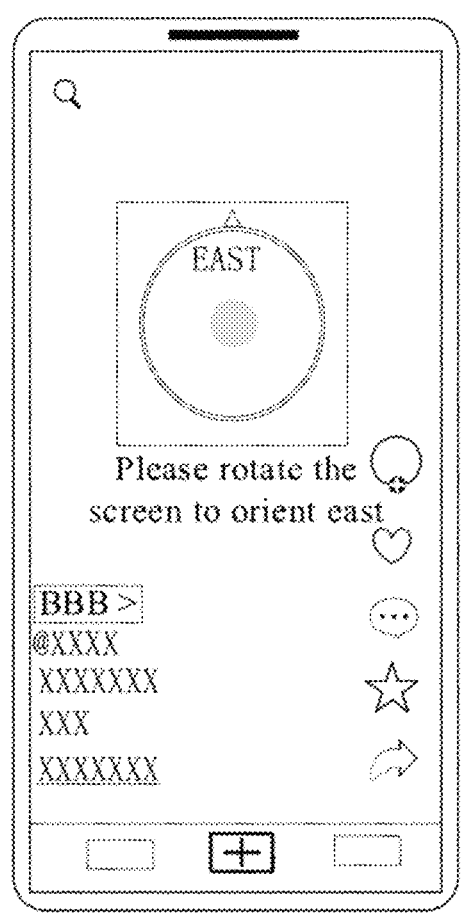
FIG. 6 is a schematic diagram showing a target appearance of the interaction component provided in an embodiment of the present disclosure.

Then, the user 910 can rotate the terminal device 120 based on this prompt information. The terminal device 120 collects gyroscope parameters within the device, obtains the device's rotation angle, orientation or other information, and controls the compass needle 2142 to rotate gradually from its initial orientation to its target orientation 2141 based on the device's rotation angle, orientation or other information. This process triggers the second control instruction of the terminal device 120 such that the terminal device 120 can control the needle 2142 to rotate based on the second control instruction to cause the needle 2142 to gradually point to the target orientation 2141; when the needle 2142 gradually points to the target orientation 2141, the compass changes from its initial appearance to the target appearance, as shown in FIG. 6.

In some embodiments, in a case where the terminal device 120 does not detect a rotation operation exceeding a preset angle such as 10 degrees during this process, the displayed compass disappears after a preset time, such as 2 seconds.

In some embodiments, the terminal device 120 can be controlled to vibrate during this process. For example, when the compass changes from its initial appearance to the target appearance, the terminal device 120 is controlled to vibrate to prompt the user that the target image page is being accessed. The vibration of the terminal device 120 in the above embodiment is illustrative only. In this embodiment, the vibration control of the terminal device 120 in this embodiment can be adjusted as needed, and this embodiment is not limited thereto.

Figure 7:
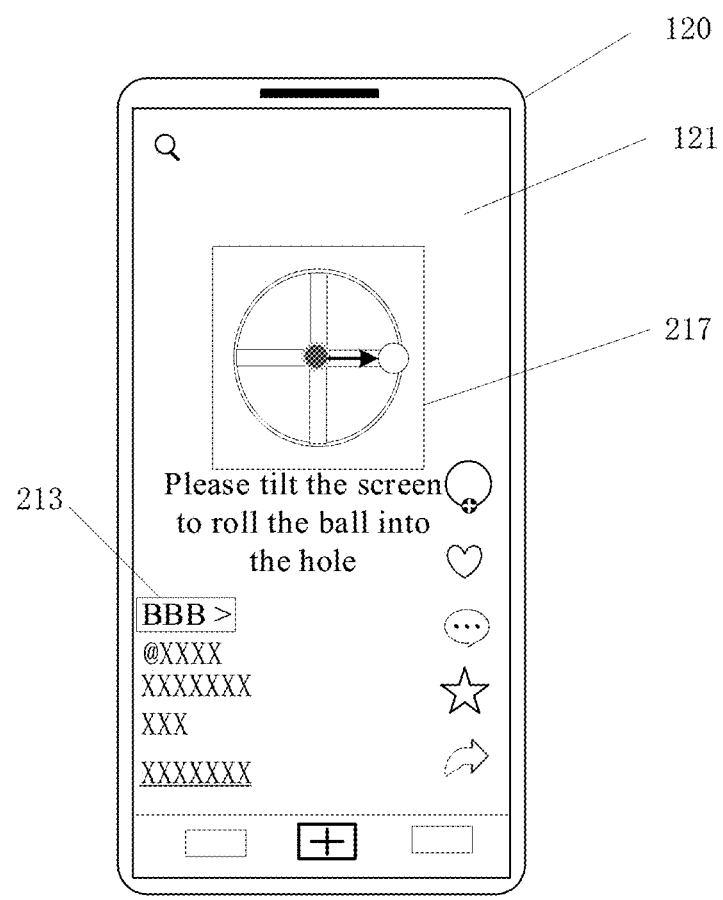
FIG. 7 is a schematic diagram showing an initial appearance of another interaction component provided in an embodiment of the present disclosure.
Figure 8:
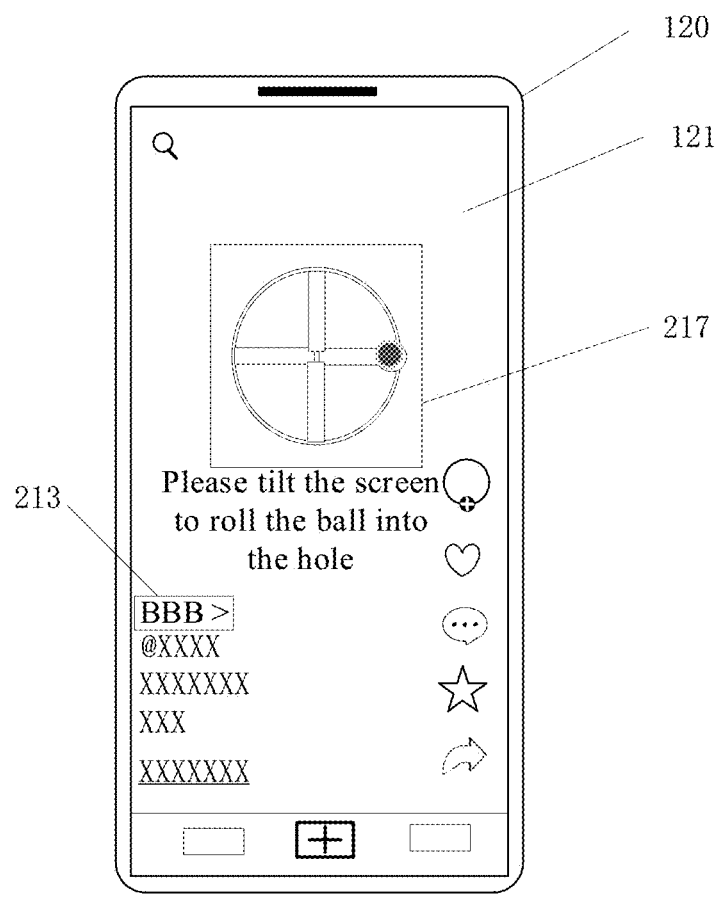
FIG. 8 is a schematic diagram showing a target appearance of another interaction component provided in an embodiment of the present disclosure.
Figure 9:
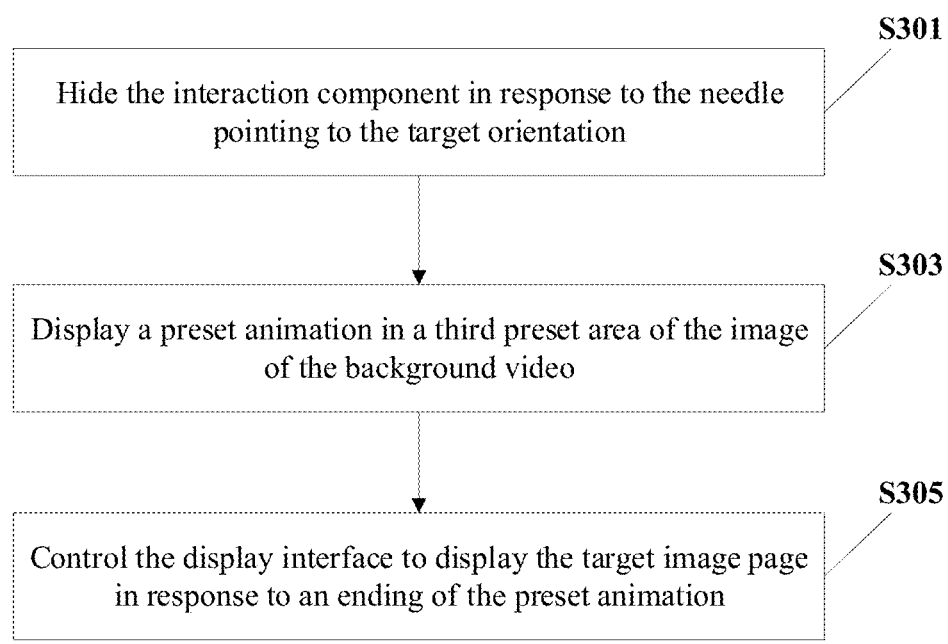
FIG. 9 is another flowchart of the interaction method provided in an embodiment of the present disclosure.

In other embodiments, as shown in FIG. 7, the initial appearance of the interaction component 217 includes a small ball located in the center and a target hole, which may be located at any position on the interaction component 217. In this case, the prompt message for instructing the user 910 to perform a specified action can be a text prompt message "Please tilt the screen to roll the ball into the hole", which causes the user to tilt the terminal device 120 to the right, thereby triggering a second control instruction, enabling the terminal device 120 to control the ball to gradually enter the target hole based on the second control instruction; when the ball enters the target hole, the interaction component 217 changes from its initial appearance to the target appearance, as shown in FIG. 8.

When the interaction component shows the target appearance, the terminal device 120 can control the display interface 121 to display the target image page. In some embodiments, this step particularly comprises the following steps.

In step S301, the interaction component is hidden in response to the needle pointing to the target orientation.

In step S303, a preset animation is displayed in a third preset area of the image of the background video.

In step S305, the display interface is controlled to display the target image page in response to an ending of the preset animation.

Figure 10:
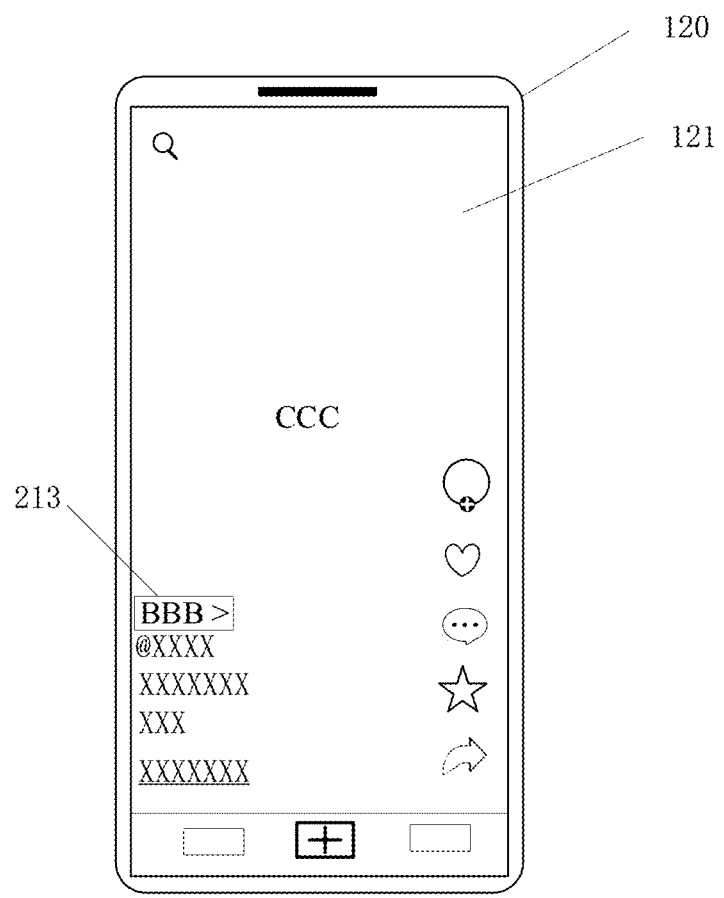
FIG. 10 is a schematic diagram showing a preset animation provided in an embodiment of the present disclosure.

In this embodiment, when the needle 2142 points to the target orientation 2141, i.e., after the interaction component 214 changes from the initial appearance to the target appearance, the interaction component 214, i.e., the compass, is hidden. In addition, a preset animation is displayed in a third preset area of the image of the background video while the background video is muted to play a preset sound effect, such as background music and a spoken introduction. The preset animation can include text information, bonus resource information, transition animation, etc. For example, as shown in FIG. 10, text information "CCC" can be displayed in the center area of the image of the background video; an animated cartoon character can be displayed at the bottom of the image of the background video, and animated bonus resources such as red envelope scatters can be displayed at the top of the image of the background video; thereafter, a transition animation showing floating clouds is displayed. After the preset animation is completed, the terminal device 120 controls the display interface 121 to display the target image page as shown in FIG. 11.

In this embodiment, before displaying the image of the background video, the terminal device 120 can obtain data files of the bonus resource information and the transition animation etc. in advance, thereby reducing the data processing load during loading of the image of the background video, ensuring the display effect of the interaction component 214, and reducing the computational load of the terminal device 120. For example, the terminal device 120 can retrieve data files of the bonus resource information and the transition animation etc. from a server 140 at a preset time and store them in the terminal device 120, and can set an effective time for the data files of the bonus resource information and the transition animation etc.; after the data files of the bonus resource information and the transition animation become effective, when a previous video image frame is displayed on the display interface 121 of the terminal device 120, the data files of the bonus resource information and the transition animation that match the image of the background video to be played can be obtained, rendered, and loaded, so as to display the bonus resource information and the transition animation when the image of the background video is played.

Figure 11:
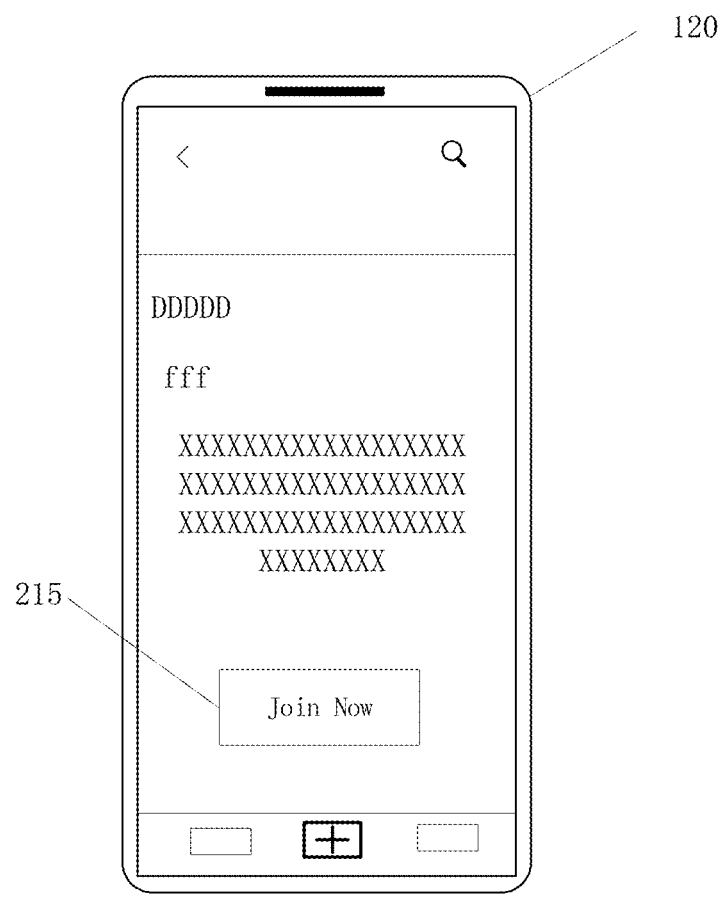
FIG. 11 is a schematic diagram showing a target image page provided in an embodiment of the present disclosure.

In some embodiments, as shown in FIG. 11, a second video accessory 215 is displayed in a third preset area of the target image page. After controlling the display interface to display the target image page, the method further comprises the following steps.

In step S401, an activity option icon is displayed in a fourth preset area of the target image page in response to a second touch instruction triggered by a click operation of the user on the second video accessory.

In S402, the display interface is controlled to display a Join Activity page in response to a third touch instruction triggered by a click operation of the user on the activity option icon.

Figure 12:
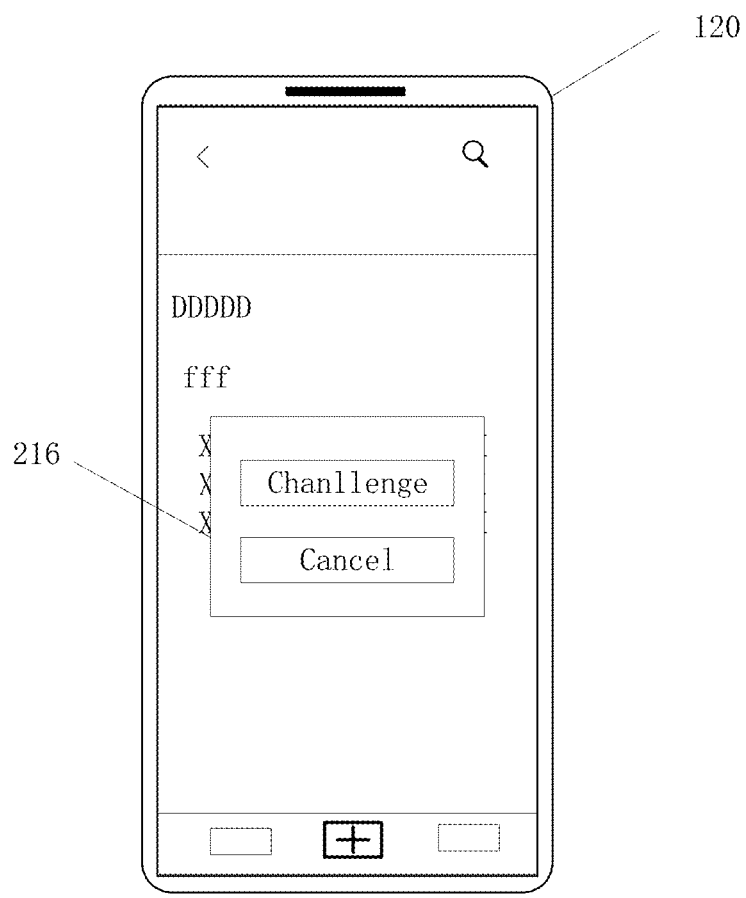
FIG. 12 is a schematic diagram showing a second video accessory provided in an embodiment of the present disclosure.

In this embodiment, the second video accessory 215 may display information such as "Join Now". When the user 910 clicks on the second video accessory 215 on the target image page, the second touch instruction is triggered on the terminal device 120. Based on the second touch instruction, the terminal device may be controlled to display an activity option icon 216 in a fourth preset area of the target image page, as shown in FIG. 12. Then the transmittance of other areas on the target image page, except for the fourth preset area, is reduced to facilitate clear display of the activity option icon 216. Thereafter, the terminal device 120 receives a third touch instruction triggered by the user clicking on the activity option icon 216. In response to the user clicking "Challenge", the display interface is controlled to display a Join Activity page based on this third touch instruction; in response to the user clicking "Cancel", he or she will not be redirected to the Join Activity page.

In other embodiments, as shown in FIGS. 4 and 5, when the first video accessory 213 is in the first or second display state, in response to the user 910 clicking on the first video accessory 213, the terminal device can receive a first touch instruction triggered by the user's click operation on the first video accessory, and control the display interface 121 to display the target image page based on the first touch instruction, as shown in FIG. 11.

In this embodiment, regardless of whether the first video accessory 213 is in the first display state or the second display state, it includes a data file for jumping to the target image page. In response to the user directly clicks on the first video accessory 213, regardless of whether or not the user interacts with the interaction component 214, the display interface 121 may display the target image page.

In some embodiments, when the user 910 clicks on the first video accessory 213 to cause the terminal device to receive the first touch instruction, the terminal device 120 obtains the user's current account information with the user's authorization and determines whether the user has been presented with the target image page or has accessed the Join Activity page previously via the second video accessory 215; if so, the Join Activity page is not be displayed, and the first video accessory 213 disappears; if not, the display interface is controlled to display the target image page.

It should be noted that the method of the embodiment of the present disclosure can be performed by a single device, such as a computer or server. The method of this embodiment can also be applied in a distributed scenario, where multiple devices cooperate with each other to perform In this distributed scenario, one of these multiple devices may only perform one or more steps in the method of the embodiment of the present disclosure, and these multiple devices interact with each other to complete the method.

It should be noted that some embodiments of the present disclosure have been described above. Other embodiments are within the scope and spirit of the appended claims. In some cases, the actions or steps recited in the claims may be carried out in a different order from the embodiments and still achieve the desired results. In addition, the processes shown in the drawings do not necessarily require a specific or sequential order to achieve the desired results. In some embodiments, multitasking and parallel processing may be advantageous.

Based on the same inventive concept and corresponding to any of the above method embodiments, this disclosure also provides an interaction apparatus.

Figure 13:
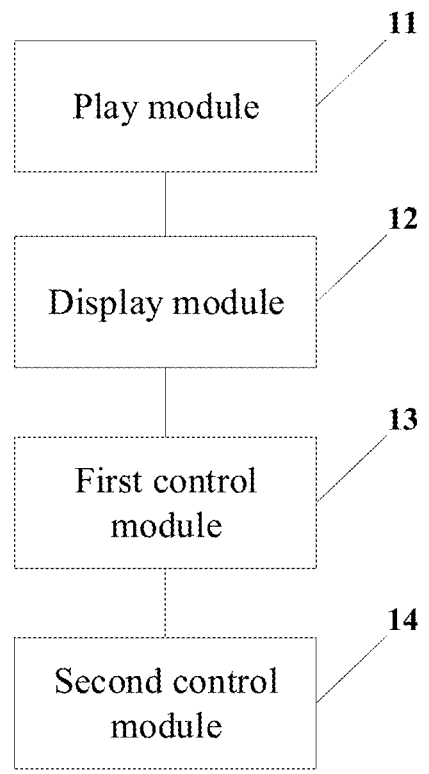
FIG. 13 is a schematic structural diagram of an interaction apparatus provided in an embodiment of the present disclosure.

As shown in FIG. 13, the interaction apparatus comprises:
a play module 11 for playing an image of a background video on the display interface in response to a first control instruction;
a display module 12 for displaying an initial appearance of an interaction component in a first preset area of the image of the background video;
a first control module 13 for controlling to change the initial appearance of the interaction component to a target appearance in response to a second control instruction triggered by a specified action of a user; and
a second control module 14 for controlling the display interface to display a target image page in response to the interaction component presenting the target appearance.

In some embodiments, the display module 12 is further used for displaying a first video accessory in a second preset area of the image of the background video before displaying the initial appearance of the interaction component in the first preset area of the image of the background video; displaying the interaction component in the first preset area in response to the first video accessory meeting a preset condition.

In some embodiments, the first video accessory meeting the preset condition comprises: the first video accessory changing from a first display state to a second display state.

In some embodiments, the display module 12 is further used for: controlling the display interface to display the target image page in response to a first touch instruction triggered by a click operation of the user on the first video accessory, wherein the first video accessory is in the first display state or the second display state.

In some embodiments, the display module 12 is further used for: in response to the first touch instruction triggered by the click operation of the user on the first video accessory, controlling the display interface to display the target image page which has not been displayed previously.

In some embodiments, the second control instruction is triggered based on a movement of the terminal device, the movement of the terminal device being controlled based on a specified action of the user.

In some embodiments, the first control module 13 is further used for: triggering the second control instruction by the movement of the terminal device based on at least one of a preset rotation angle, a preset rotation direction, a preset number of rotations, or a preset rotation speed.

In some embodiments, the interaction component comprises a compass; the display module 12 is further used for: displaying an initial orientation and a target orientation of a needle of the compass, and prompt information for indicating the user to perform the specified action, wherein the initial orientation and the target orientation are not coincident.

The first control module: 13 is further used for: controlling the needle to rotate based on the second control instruction to point the needle to the target orientation.

In some embodiments, the target orientation is determined based on collected device orientation information of the terminal device; or the target orientation is randomly obtained orientation information.

In some embodiments, the second control module 14 is further used for:
hiding the compass in response to the needle pointing to the target orientation;
displaying a preset animation in a third preset area of the image of the background video; and
controlling the display interface to display the target image page in response to an ending of the preset animation.

In some embodiments, a second video accessory is displayed in the third preset area of the target image page; the display module 12 is further used for:

after controlling the display interface to display the target image page, displaying an activity option icon in a fourth preset area of the target image page in response to a second touch instruction triggered by a click operation of the user on the second video accessory; and controlling the display interface to display a Join Activity page in response to a third touch instruction triggered by a click operation of the user on the activity option icon.

For the convenience of description, the above apparatus is divided into various modules based on their functions. Of course, in the implementation of this disclosure, the function of each module may be implemented in the same or different software and/or hardware.

The apparatus of the above embodiment is used to implement the interaction method in any of the above embodiments, and has the beneficial effects of the corresponding method embodiment, which will not be repeated here.

Based on the same inventive concept and corresponding to any of the above method embodiments, the present disclosure further provides a terminal device comprising a memory, a processor, and a computer program stored in the memory and executable by the processor, wherein the processor, when executing the program, performs the method of any one of the above embodiments.

Figure 14:
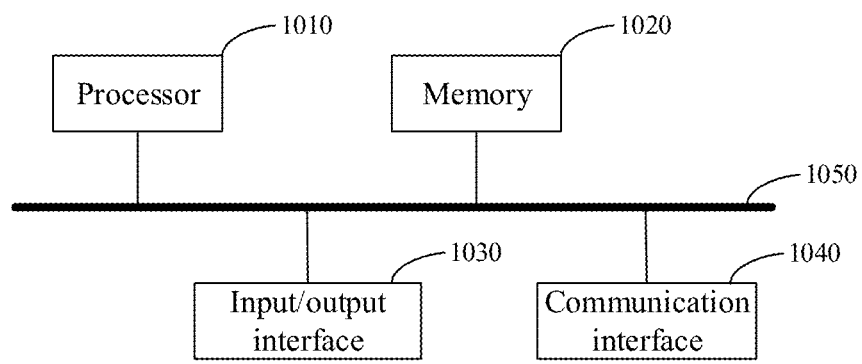
FIG. 14 is a schematic structural diagram of a terminal device provided in an embodiment of the present disclosure.

FIG. 14 shows a schematic structure diagram of a more detailed hardware structure of an electronic device provided by this embodiment. The device may comprise: a processor 1010, a memory 1020, an input/output interface 1030, a communication interface 1040, and a bus 1050. The processor 1010, the memory 1020, the input/output interface 1030, and the communication interface 1040 are connected to each other through the bus 1050 for communication within the device.

The processor 1010 may be implemented using a general purpose central processing unit (CPU), a microprocessor, an application specific integrated circuit (ASIC), or one or more integrated circuits to execute related programs and implement the technical solution provided in the embodiments of this description.

The memory 1020 can be implemented in various forms such as ROM (Read Only Memory), RAM (Random Access Memory), static storage devices and dynamic storage devices, etc. The memory 1020 may store operating systems and other application programs. When the technical solutions provided in the embodiments of this description are implemented by software or firmware, the corresponding program codes are stored in the memory 1020 and invoked and executed by the processor 1010.

The input/output interface 1030 is used to connect input/output modules for information input and output. The input/output modules can be provided as components in the device (not shown in the figure), or can be connected externally to the device to provide appropriate functions. The input device can include a keyboard, a mouse, a touch screen, a microphone, various sensors, etc., while the output device can include a display, a speaker, a vibrator, an indicator light, etc.

The communication interface) is used to connect communication modules (not shown in the figure) to achieve communication interaction between this device and other devices. The communication module can communicate in wired manners (e.g., via USB, Ethernet cables, etc.) or wireless manners (e.g., via mobile networks, WIFI, Bluetooth, etc.).

The bus 1050 includes a path for transmitting information between various components of the device (e.g., the processor 1010, the memory 1020, the input/output interface 1030, and the communication interface 1040).

It should be noted that although only the processor 1010, the memory 1020, the input/output interface 1030, the communication interface 1040, and the bus 1050 are illustrated in the above device, in specific implementations, the device may also include other components necessary for normal operation. In addition, those skilled in the art will understand that the above device may include only those components necessary to implement the embodiments of this description and not necessarily all the components shown in the figure.

The electronic device of the above embodiment is used to implement the method in any of the above embodiments, and has the beneficial effects of the corresponding method embodiment, which will not be repeated here.

Based on the same inventive concept and corresponding to any of the above method embodiments, the present disclosure further provides a non-transitory computer-readable storage medium, characterized in that the non-transitory computer-readable storage medium stores computer instructions used to cause a computer to perform the method in any of the above embodiments.

The computer-readable medium in this embodiment includes permanent and non-permanent, removable and non-removable media, and information storage can be realized by any method or technology. The information can be computer-readable instructions, data structures, program modules, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, CD-ROM, digital versatile disc (DVD) or other optical storage, magnetic cassettes, magnetic tape, magnetic disk storage or other magnetic storage devices, or any other non-transmission media that can be used to store information that can be accessed by computing devices.

The computer instructions stored in the storage medium of the above embodiment is used to implement the method in any of the above embodiments, and has the beneficial effects of the corresponding method embodiment, which will not be repeated here.

Based on the same inventive concept and corresponding to any of the above method embodiments, this disclosure also provides a computer program product including a tangible computer readable medium stored thereon computer readable instructions. In some embodiments, the computer readable instructions are executed by one or more processors to cause the processors to perform the method. Each step of the method in any of the above embodiments may have a corresponding execution subject, wherein the processor executing the corresponding step may belong to the corresponding execution subject.

The computer program product in the above embodiment is used to cause the processor to implement the method in any of the above embodiments, and has the beneficial effects of the corresponding method embodiment, which will not be repeated here.

The "apparatus" and "modules" in various embodiments of this application can be implemented by hardware units, software units, or combinations thereof. Examples of hardware units may include devices, components, processors, microprocessors, circuits, circuit elements (such as transistors, resistors, capacitors, inductors, etc.), integrated circuits, specialized integrated circuits (ASICs), programmable logic devices (PLDs), digital signal processors (DSPs), field programmable gate arrays (FPGAs), memory units, logic gates, registers, semiconductor devices, chips, microchips, chipsets, etc. Examples of software units may include software components, programs, apps, computer programs, application programs, system programs, machine programs, operating system software, middleware, firmware, software modules, routines, subroutines, functions, methods, procedures, software interfaces, application programming interfaces (APIs), instruction sets, computing code, computer code, code segments, computer code segments, words, values, symbols, or any combination thereof. The determination of whether an embodiment is implemented by the use of hardware and/or software units may vary according to any number of factors such as desired computing speed, power level, thermal resistance, processing cycle budget, input data rate, output data rate, memory resources, data bus speed, and other design or performance constraints as desired for a given implementation.

Some embodiments may include manufactured products. The manufactured products may include storage media used to store logic. Examples of storage media may include one or more types of computer-readable storage media capable of storing electronic data, including volatile or non-volatile memory, removable or non removable memory, erasable or non erasable memory, writable or rewritable memory, and so on. Examples of logic can include various software units, such as software components, programs, apps, computer programs, application programs, system programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. In an embodiment, for example, the manufactured product may store executable computer program instructions that, when executed by the computer, cause the computer to perform methods and/or operations according to the described embodiment. The executable computer program instructions may include any appropriate type of code, such as source code, compiled code, interpreted code, executable code, static code, dynamic code, and so on. The executable computer program instructions can be implemented in predefined computer languages, methods, or syntax to instruct a computer to perform certain functions. Instructions can be implemented using any appropriate high-level, low-level, object-oriented, visual, compiled, and/or interpreted programming language.

It should be understood by those of ordinary skill in the art that the discussion of any of the above embodiments is merely exemplary and is not intended to suggest that the scope of the disclosure (including the claims) is limited to these examples; in the concepts of this disclosure, combinations of the technical features in the above embodiments or different embodiments can also be combined, the steps can be carried out in any order, and there are many other variations of the various aspects of the present disclosure as described above, which are not provided in detail for the sake of brevity.

In addition, for ease of explanation and discussion and to avoid making the embodiments difficult to understand, known power/ground connections to integrated circuit (IC) chips and other components may or may not be shown in the drawings provided herein. In addition, the apparatus may be shown in the form of block diagrams to avoid making the embodiments difficult to understand, and this also takes into account the fact that the details of the implementation of the apparatus in these block diagrams are highly dependent on the platform on which the embodiment is implemented (i.e., these details should be fully within the understanding of those skilled in the art). It will be apparent to those skilled in the art that specific details (e.g., circuits) have been elaborated to describe the exemplary embodiments of the present disclosure, and it is possible to implement the embodiments of the present disclosure without these specific details or with changes to these specific details. Therefore, these descriptions should be considered explanatory rather than restrictive.

Although the present disclosure has been described in conjunction with specific embodiments, many substitutions, modifications, and variations of these embodiments will be apparent to those skilled in the art based on the forgoing description. For example, other memory architectures (such as Dynamic RAM (DRAM)) can be used in the discussed embodiments.

The embodiments of the present disclosure are intended to cover all such substitutions, modifications and variations falling within the broad scope of the appended claims. Within spirit and principles of the embodiments of the present disclosure, any omissions, modifications, equivalent replacements, improvements etc. shall be contained in the protection scope of this invention.

What is claimed is:

1. An interaction method applied to a terminal device with a display interface, comprising:

playing an image of a background video on the display interface in response to a first control instruction;

displaying a first video accessory in a second preset area of the image of the background video;

displaying an initial appearance of an interaction component in a first preset area of the image of the background video in response to the first video accessory meeting a preset condition;

controlling to change the initial appearance of the interaction component to a target appearance in response to a second control instruction triggered by a specified action of a user; and controlling the display interface to display a target image page in response to the interaction component presenting the target appearance, wherein the second control instruction is triggered based on a movement of the terminal device, the movement of the terminal device being controlled based on a specified action of the user, triggering the second control instruction based on the movement of the terminal device comprises: triggering the second control instruction by the movement of the terminal device based on at least one of a preset rotation angle, a preset rotation direction, a preset number of rotations, or a preset rotation speed, the interaction component comprises a compass, and wherein the controlling the display interface to display the target image page in response to the interaction component presenting the target appearance comprises:

hiding the compass in response to the needle pointing to the target orientation;

displaying a preset animation in a third preset area of the image of the background video; and controlling the display interface to display the target image page in response to an ending of the preset animation.

2. The interaction method according to claim 1, wherein the first video accessory meeting the preset condition comprises:

the first video accessory changing from a first display state to a second display state.

3. The interaction method according to claim 2, further comprising:

controlling the display interface to display the target image page in response to a first touch instruction triggered by a click operation of the user on the first video accessory, wherein the first video accessory is in the first display state or the second display state.

4. The interaction method according to claim 3, wherein the controlling the display interface to display the target image page in response to the first touch instruction triggered by the click operation of the user on the first video accessory comprises:

in response to the first touch instruction triggered by the click operation of the user on the first video accessory, controlling the display interface to display the target image page which has not been displayed previously.

5. The interaction method according to claim 1, wherein the displaying the initial appearance of the interaction component comprises:

displaying an initial orientation and a target orientation of a needle of the compass, and prompt information for indicating the user to perform the specified action, wherein the initial orientation and the target orientation are not coincident.

6. The interaction method according to claim 5, wherein:

the target orientation is determined based on collected device orientation information of the terminal device; or the target orientation is randomly obtained orientation information.

7. The interaction method according to claim 1, wherein the controlling to change the initial appearance of the interaction component to a target appearance comprises:

controlling the needle to rotate based on the second control instruction to point the needle to the target orientation.

8. The interaction method according to claim 1, wherein a second video accessory is displayed in the third preset area of the target image page, and the interaction method further comprises:

after controlling the display interface to display the target image page, displaying an activity option icon in a fourth preset area of the target image page in response to a second touch instruction triggered by a click operation of the user on the second video accessory; and controlling the display interface to display a Join Activity page in response to a third touch instruction triggered by a click operation of the user on the activity option icon.

9. A terminal device, comprising:

a memory; and a processor coupled to the memory, the processor configured to, based on instructions stored in the memory, carry out an interaction method comprising:

playing an image of a background video on the display interface in response to a first control instruction;

displaying a first video accessory in a second preset area of the image of the background video;

displaying an initial appearance of an interaction component in a first preset area of the image of the background video in response to the first video accessory meeting a preset condition;

controlling to change the initial appearance of the interaction component to a target appearance in response to a second control instruction triggered by a specified action of a user; and controlling the display interface to display a target image page in response to the interaction component presenting the target appearance, wherein the second control instruction is triggered based on a movement of the terminal device, the movement of the terminal device being controlled based on a specified action of the user, triggering the second control instruction based on the movement of the terminal device comprises: triggering the second control instruction by the movement of the terminal device based on at least one of a preset rotation angle, a preset rotation direction, a preset number of rotations, or a preset rotation speed, the interaction component comprises a compass, and wherein the controlling the display interface to display the target image page in response to the interaction component presenting the target appearance comprises:

hiding the compass in response to the needle pointing to the target orientation;

displaying a preset animation in a third preset area of the image of the background video; and controlling the display interface to display the target image page in response to an ending of the preset animation.

10. The terminal device according to claim 9 wherein the first video accessory meeting the preset condition comprises:

the first video accessory changing from a first display state to a second display state.

11. The terminal device according to claim 10, wherein the processor is further configured to:

control the display interface to display the target image page in response to a first touch instruction triggered by a click operation of the user on the first video accessory, wherein the first video accessory is in the first display state or the second display state.

12. The terminal device according to claim 11, wherein the controlling the display interface to display the target image page in response to the first touch instruction triggered by the click operation of the user on the first video accessory comprises:

in response to the first touch instruction triggered by the click operation of the user on the first video accessory, controlling the display interface to display the target image page which has not been displayed previously.

13. A non-transitory computer-readable storage medium stored thereon a computer program that, when executed by a processor, implements an interaction method comprising:

playing an image of a background video on the display interface in response to a first control instruction;

displaying a first video accessory in a second preset area of the image of the background video;

displaying an initial appearance of an interaction component in a first preset area of the image of the background video in response to the first video accessory meeting a preset condition;

controlling to change the initial appearance of the interaction component to a target appearance in response to a second control instruction triggered by a specified action of a user; and controlling the display interface to display a target image page in response to the interaction component presenting the target appearance, wherein the second control instruction is triggered based on a movement of the terminal device, the movement of the terminal device being controlled based on a specified action of the user, triggering the second control instruction based on the movement of the terminal device comprises: triggering the second control instruction by the movement of the terminal device based on at least one of a preset rotation angle, a preset rotation direction, a preset number of rotations, or a preset rotation speed, the interaction component comprises a compass, and wherein the controlling the display interface to display the target image page in response to the interaction component presenting the target appearance comprises:

hiding the compass in response to the needle pointing to the target orientation;

displaying a preset animation in a third preset area of the image of the background video; and controlling the display interface to display the target image page in response to an ending of the preset animation.

\* \* \* \* \*